April 23, 1957 W. P. BELDEN 2,789,640
MACHINE AND PROCESS FOR CUTTING AND CONVEYING SMALL PATCHES
Filed April 9, 1953
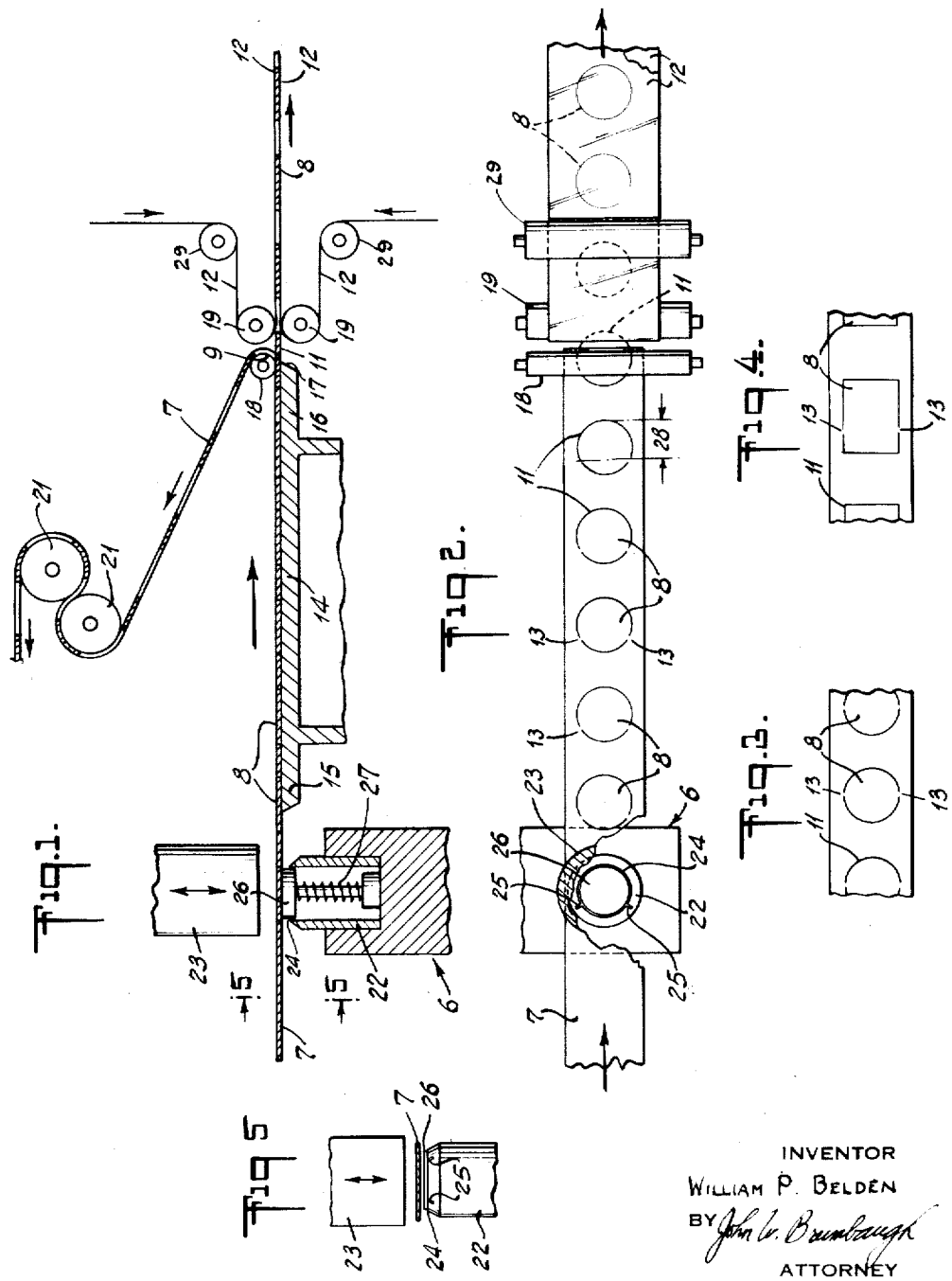
INVENTOR
WILLIAM P. BELDEN
BY John W. Brumbaugh
ATTORNEY

United States Patent Office 2,789,640
Patented Apr. 23, 1957

2,789,640

MACHINE AND PROCESS FOR CUTTING AND CONVEYING SMALL PATCHES

William P. Belden, Highland Park, N. J., assignor to Johnson & Johnson, a corporation of New Jersey Application April 9, 1953, Serial No. 347,790

13 Claims. (Cl. 164—18)

The present invention relates to a method and apparatus for cutting small patches from a strip of material and conveying them, more particularly to a method and apparatus for cutting and conveying small patches such as medical dressings, foot pads, etc., from a strip of material prepared for this purpose.

The high speed cutting of small patches or pads from a strip of patch material and handling the individual patches to the next step, as for instance wrapping, has presented basic difficulties. It has been most difficult to obtain control of the motion of the patches after cutting in order to convey them and present them in an orderly fashion for wrapping, particularly when, as for dressings, they are wrapped individually. Various supplementary conveying means have been used or proposed for use between the cutting and wrapping steps. These include rollers or cylinders to which individual patches are stuck by virtue of their own adhesiveness, as well as conveying belts having special parts for holding the patches. When the patches are adhered to a special cylinder or conveyer, they must be stripped therefrom by a device for this purpose prior to wrapping, and when a belt with holding means is used the movement of the patches from the die or cutter to the belt and from the belt to the wrapping means must be controlled. This latter control has been difficult and attempts to stamp patches out of a strip through a die onto a belt having holding means for individual patches have proven extremely wasteful when the die is operated at high speeds. Prior art methods and apparatus have generally been unnecessarily complicated, involving special means for conveying individual patches or pads from the cutting step, and even when these special means have been used, operations have suffered from lack of control of the individual patches which has had the effect of increasing waste, sometimes to a prohibitive extent.

It is an object of the present invention to provide a method and apparatus for cutting small patches from a strip of patch material and maintaining control over them as they are being conveyed to the next step without the necessity for special conveying means for the individual patches.

Another object of the invention is to use the strip of patch material itself to convey the cut out patches and present them individually for further processing.

Still another object of the invention is to use the strip of patch material to convey patches cut therefrom and present them between bands of wrapping material which remove the patches from the strip and hold them in conveying relation with the wrapping material for wrapping purposes.

A further object is to provide such an apparatus and process which will operate at high speeds with a minimum of waste.

A still further object of the invention is to provide an apparatus and process which is extremely simple, which has a minimum of moving parts and which is economical to construct and operate.

Other and further objects of the invention will be apparent from the following description and claims taken together with the drawings wherein:

Fig. 1 is a schematic sectional view of a typical embodiment of the invention.

Fig. 2 is a partially cut away schematic plan view of this embodiment.

Fig. 3 is a detail view of a section of a strip showing a patch attached thereto in a slightly different manner than those of Fig. 2.

Fig. 4 is a detail view of another section of strip showing a different shape patch attached to a strip in a still different way.

Fig. 5 is a schematic sectional view along the line 5—5 of Fig. 1.

In the present invention, a strip of material 7 is passed in way of a die 6 which cuts out patches 8 therefrom while leaving them in place in the strip. The patches are carried away from the die by means of the strip which is then pulled around a turning surface 9 in such a way that the cut out leading edges 11 of the patches will protrude from the surface while the strip follows the contour thereof. The protruding patch edges may be gripped and the patches individually removed from the strip for further processing. For example, they may be gripped between opposed layers 12 of wrapping material and carried away while held in position for wrapping purposes.

Preferably, in order to hold the cut patches in place in the strip and assist in positioning them on the turning surface, the die leaves small uncut portions 13 attaching the patches transversely to the strip. The cutting edge or edges of the die and coacting parts are shaped to leave only relatively small uncut attaching portions. These portions 13 must be disposed to define a cut out leading edge which will protrude sufficiently from the turning surface to allow the patch to be gripped. The partially cut out patches in the strip of Fig. 2 each have a pair of uncut portions arranged approximately 120° to the rear of the longitudinal center line of the patch. Good results are obtained when each of the patches has an unattached leading edge defined by at least that portion of its periphery in advance of the transverse center line of the patch. The leading edges 11 of the patches of Figs. 2, 3, and 4 all fall within this definition. When the patch is circular, the uncut portions preferably should be within that portion of its perimeter between 90° and 120° to the rear and on each side of the longitudinal center line of the patch, as shown in Figs. 2 and 3. The lengths of the uncut leading edges will be determined in the final analysis by the relationship between the turning surface which causes the patches to protrude and the rollers or other means used to pick the patches from the strip. This relationship will be discussed more fully hereinafter.

If the material of the strip is sufficiently rigid and the uncut portions holding the patches thereto are strong enough, the strip 7 alone can be used to convey the patches from the die and present them at the turning surface. However, if the strip is relatively thin and flexible with limited strength, such as a laminate of plastic adhesive tape and crinoline for dressings would be, and the uncut portions are quite small to allow the patches to be picked from the strip with ease, guide means 14 may be placed under the strip between the die 6 and the turning surface 9. Preferably one end 15 of the guide means, which may be in the form of a table or sliding surface, is placed close to the die and the other end 16 close to the turning surface 9 to prevent the patches from turning out of the plane of the strip, or from falling through the strip in the event that the uncut portions are accidentally broken by the die or by other causes. The guide also prevents the otherwise unsupported length of strip between the die and the turning surface from vibrating to interfere with smooth functioning.

The guide 14 may also perform another very important function. It may be extended under the turning surface such that it will support the patches carried by the strip until they are gripped and carried away by opposed layers of wrapping material 12, or other means, in which case the patches will protrude from the strip whether or not they are attached by uncut portions as described above. This is assuming that completely cut out patches will remain in place in the strip after dieing and during conveying. If the patch material is sufficiently thick and rigid, the patches may be completely cut out, held in the strip by virtue of their thickness, and pulled by the strip along the guide, such that they will continue to move in the plane of the guide as the strip is pulled around the turning surface. However, for thin flexible materials, such as a laminate of plastic adhesive tape and crinoline used for dressings, the patches are held to the strip by uncut portions 13 as described hereinbefore. In Fig. 1, the edge 17 of the end 16 of the guide means extends under roller 18 presenting the turning surface 9 to define with the roller a constraining slot through which the strip must move. Thus, the patches may be held in this slot supported by the surface of the guide 14 until they are gripped and pulled from the strip between the opposed layers of wrapping material 12. The nip rollers 19, or other means, carrying the wrapping paper are so spaced from the edge 17 of the guide that the patches are gripped in the nip between them before they leave said constraining slot.

Referring to Figs. 1, 2 and 5, a strip 7 of patch material is pulled intermittently through a die 6 which partially cuts patches therefrom, thence over guide means 14 in the form of a table or slide, and around a turning roller 18 by pull rollers 21. The die comprises a fixed hollow cutter 22 and a mating anvil 23 which is movable against the cutter to stamp out circular patches 8 from the strip. The cutter may be in the form of a cylindrical tube with a cutting edge 24 on its inner surface. Either this edge or a corresponding portion of the anvil may contain recesses arranged to define the above-described uncut portions when the die is operated to bring the anvil against the cutting edge. Figs. 2 and 5 show a pair of recesses 25 in the cutter located approximately 120° to the rear and on either side of the longitudinal center line of the cutter edge. The width of these recesses depends upon the desired width of uncut attaching portions which in turn depends upon the size and nature of the patches and the material from which they are cut. They must be maintained sufficiently small to allow the patches to be pulled from the strip with ease and sufficiently large to prevent their breaking due to vibrations and other forces occurring during operation. For approximately ¾ inch diameter dressing laminates of plastic adhesive tape and crinoline about 0.014 inch thick, two recesses approximately 0.01 inch wide, spaced as in Fig. 2, give good results. As indicated by the arrows in Figs. 1 and 5, the anvil 23 moves up and down in a reciprocating fashion to contact the cutter 22 intermittently. Its intermittent downward motion may be controlled by an eccentric cam which is geared or otherwise connected to the mechanism which intermittently drives the pull rolls 21 such that the anvil strikes the cutter when the strip is stationary. In order to prevent the partially cut out portion of the patch from sticking inside the cutter, the spring loaded plunger 26 is provided. This plunger is pressed down slightly when the anvil contacts the cutter and is urged upward by the spring 27 to clear the strip from the cutter when the anvil retreats.

The strip 7 with partially cut out patches 8 attached thereto through the uncut portions 13 is pulled around the turning surface 9 of a roller 18 by the pull rolls 21. As previously mentioned, the strip itself is pulled around the surface of the roller while the cut out leading edges 11 of the patches tend to continue traveling in their path of approach to the roller to protrude from the strip. They will tend to protrude in this direction as long as the transverse uncut portions holding the patches to the strip do not pass the point of tangency between the line of approach of the strip and the roller to begin moving around the turning surface. After the uncut portions pass this point, the patch will tend to arrange itself in a plane tangent to the surface of the roller along the line between the transverse uncut portions. Thus, the portion of the patch extending forwardly from the surface of the strip, or the "free length" of the patch, is measured by the longitudinal distance between the leading point on the perimeter of the patch and the transverse line between the uncut portions, as shown at 28 in Fig. 2. This "free length" is the longitudinal component of the unattached leading edge of the patch. For a given size roller or turning surface, the greater the "free length," the easier it will be to grip the leading edge of a patch. When I use the term "free length" in the following description and claims, I have reference to the above definition.

The turning surface may be defined by any suitable structure which will give a predictable separation between the patches and the strip as they are turned. A roller is preferred because of its simplicity and because it may be fixed on its axis or rotatably mounted. When rotatable, it contributes to ease of operation by reducing frictional drag and generally giving better control. In order to provide ready access to the protruding patch edges, it is preferred that the diameter of the turning roller be at least no greater than the length of a patch.

Fig. 1 clearly shows opposed bands 12 of wrapping material which move around and through the nip between a pair of rollers 19 to grip the protruding leading edges 11 of the patches in the nip and pull them from the strip and through the nip while held in conveying relation with the wrapping material for wrapping purposes. Any structure, which will allow the opposed bands of wrapping material to converge such that the leading edges of the patches may come between them to be gripped as the bands approach each other, may be used. However, opposed rollers 19 such as shown in Figs. 1 and 2 are preferred.

Preferably, these rollers 19 are rotatable and spring urged towards one another to provide the requisite nip pressure. If the patches being handled are medical dressing, for instance, comprising a soft absorbent pad between layers of adhesive material and crinoline, it becomes important to control the nip pressure so as not to compress the absorbent pad seriously. Preferably also, a stop, not shown, may be used to hold the rolls apart slightly to allow the leading edges of the patches to enter the nip easily. The rollers 19 and the approach rollers 29 may be fixed such that the opposed bands of wrapping material can be pulled around them and through the nip. However, it is preferred that they be rotatable although they need not be driven, in order to reduce the frictional drag on the wrapping material and allow greater speed of operation.

Generally speaking, the leading edge of each patch as it protrudes should be gripped in the nip between the rollers before the uncut portions 13 of the patch begin to turn around the roller. Thus, the distance between the nip rollers and the turning rollers is a function of the "free length" of the patch and the thickness thereof. Theoretically, if the patch had no thickness and the nip rollers were touching each other, the distance between a line connecting the centers of the nip rollers and a parallel line through the center of the turning roller would be equivalent to the "free length" of the patch. However, since the patch has appreciable thickness, the distance to the center line of the nip will be slightly greater than the "free length" of the patch by an amount which will vary with the thickness of the patch, the clearance between the bands of wrapping material passing around the rollers, and to a lesser extent the diameters of the rollers 19. The above assumes that the nip rollers are arranged with respect to the turning roller such that a tangent through the nip is tangent to the turning roller. If the nip is turned or displaced so as not to have a common tangent with the turning roller, the above conditions will vary somewhat and appropriate allowances must be made therefor.

The motion of the strip around the turning roller first tends to offer the patches to the nip and then take them away as the attached portions of the patch start to pull around the turning roller. As described above, the nip should be positioned such that it grips the leading edges of the patches before they are pulled away by the strip. If the wrapping material is moved around the nip rollers more slowly than the strip is moving around the turning rollers, jamming will occur between the turning coller and the nip just after the patches are gripped in the nip. To avoid this, the wrapping material is moved at a greater linear speed than the strip. Even so, the patches will probably be bent slightly as the attaching portions start to move around the turning roller before they are pulled through the nip. Spacing of the patches in the wrapping material can be controlled by the relative speeds of the wrapping material and the strip. Spacing can be increased by increasing the speed of the wrapping material and decreased by decreasing this speed.

Preferably, and as shown in Figs. 1 and 2, the nip rollers 19 should be slightly larger than the turning roller 18. Thus, a relatively sharp turning surface may be obtained to provide greater access to the protruding patch edges, and the larger nip rollers provide a deeper slot in which to catch the patches before they are pulled around the turning rollers. The relative size of these rollers may vary considerably depending upon the length of the patches, speed of operation, the delicacy and/or thickness of the patch material, etc., as well as the arrangement of the nip with respect to the turning roller.

It will be seen that I have provided a method and apparatus for cutting small patches, such as dressings, from a strip prepared for that purpose and maintaining control over them as they are being conveyed to the next step without using any special means for conveying individual patches. The strip 7 conveys the cut out patches from the die to the turning roller where they are presented individually for further processing. The uncut portions 13 and the guide 14 both help to maintain control over the patches and to present them at the turning roller. As the patches are presented, their protruding leading edges are gripped between opposed bands of wrapping material moving around and through the nip between a pair of rollers such that the patches are gripped in the nip to be pulled from the strip and held in conveying relation with the wrapping material for wrapping purposes. This process and the apparatus for performing it is extremely simple and efficient and will operate at high speeds with a minimum of waste. It also involves a minimum of moving parts and is economical to construct and operate.

I claim:

1. The method of cutting small patches from a strip of material and conveying them which comprises passing a strip of patch material in way of a die, operating the die to cut out patches from the strip while leaving small uncut portions attaching the patches thereto such that each of said patches has a forwardly extending unattached leading edge, pulling said strip around a turning surface such that the unattached leading edges of said patches will protrude from said surface while said strip follows the contour of the surface, and gripping the protruding leading edges as they are presented to break the small uncut portions and pull the patches from the strip.

2. The method of cutting small patches from a strip of material and conveying them according to claim 1, wherein the said protruding edges are gripped between opposed moving bands of wrapping material which pull said patches from the strip and hold them in conveying relation with the wrapping material for wrapping purposes.

3. The method of cutting small patches from a strip of material and conveying them according to claim 2, wherein the opposed bands of wrapping material are moving around opposed rollers and through the nip between them and said patches are gripped in said nip.

4. The method of cutting small patches from a strip of material and conveying them according to claim 2, wherein the opposed bands of wrapping material are moved at a greater linear speed than said strip.

5. The method of cutting small patches from a strip of material and conveying them according to claim 1, wherein said turning surface is presented by a small roller.

6. The method of cutting small patches from a strip of material and conveying them according to claim 5, wherein the diameter of said small roller is less than the length of said patches.

7. The method of cutting small patches from a strip of material and conveying them according to claim 1 wherein the strip carrying said patches is supported between said die and said turning surface by guide means.

8. The method of cutting small patches from a strip of material and conveying them according to claim 3, wherein the patches are supported in the strip by guide means until they are gripped in the nip between said rollers.

9. The method of cutting small patches from a strip of material and conveying them which comprises passing a strip of patch material in way of a die, operating the die to cut out patches from the strip while leaving small uncut portions attaching the patches thereto such that each of said patches has an unattached leading edge defined by at least that portion of its periphery in advance of the transverse center line of the patch, pulling said strip around a turning surface such that the unattached leading edges of said patches will protrude from said surface while said strip follows the contour of the surface, and gripping the protruding leading edges as they are presented to break the small uncut portions and pull the patches from the strip.

10. The method of cutting small patches from a strip of material and conveying them which comprises passing a strip of patch material in way of a die, operating the die to cut out circular patches from the strip while leaving small uncut portions attaching the patches thereto such that each of said patches has an unattached leading edge defined by substantially that portion of its periphery extending rearwardly 90° to 120° on each side of the longitudinal center line of the patch, pulling said strip around a turning surface such that the cut out leading edges of said patches will protrude from said surface while said strip follows the contour of the surface, and gripping the protruding leading edges as they are presented to break the small uncut portions and pull the patches from the strip.

11. An apparatus of the type decribed comprising a die adapted to cut out small patches from a strip of material passed therethrough while leaving relatively small uncut portions attaching the patches to the strip such that each of said patches has a forwardly extending unattached leading edge, a turning surface, strip-moving means for pulling said strip from said die and around said turning surface such that the unattached leading edges of said patches will protrude from the surface while said strip follows the contour thereof, and gripping means spaced from the turning surface for gripping the protruding edges of said patches and pulling them from the strip.

12. An apparatus according to claim 11, wherein said turning surface is a small roller and said gripping means comprises a pair of rollers forming a nip between them, wherein said patches may be gripped in the nip to be pulled from the strip.

13. An apparatus according to claim 11, wherein said rollers are so disposed that a tangent through said nip is substantially tangent to said turning roller, and the rollers are so spaced that the distance between a line connecting the centers of the nip rollers and a parallel line through the center of the turning roller is only slightly greater than the "free length" of the unattached leading edge of said patches.

References Cited in the file of this patent

UNITED STATES PATENTS

| | | |
|---|---|---|
| Re. 21,718 | McFarland et al. | Feb. 18, 1941 |
| 1,760,019 | Stacey | May 27, 1930 |
| 1,838,065 | Last | Dec. 22, 1931 |
| 1,942,398 | Fowler | Jan. 9, 1934 |
| 2,167,734 | Zonino | Aug. 1, 1939 |
| 2,232,783 | Hausher | Feb. 25, 1941 |
| 2,561,050 | Charron | July 17, 1951 |
| 2,655,842 | Baumgartner | Oct. 20, 1953 |

U. S. DEPARTMENT OF COMMERCE
PATENT OFFICE

CERTIFICATE OF CORRECTION

Patent No. 2,789,640     William P. Belden     April 23, 1957

It is hereby certified that error appears in the printed specification of the above numbered patent requiring correction and that the said Letters Patent should read as corrected below.

Column 7, line 6, for the claim reference numeral "11" read -- 12 --.

Signed and sealed this 10th day of June 1958.

(SEAL)
Attest:

KARL H. AXLINE
Attesting Officer

ROBERT C. WATSON
Commissioner of Patents